US009354067B2

(12) United States Patent
Chao et al.

(10) Patent No.: US 9,354,067 B2
(45) Date of Patent: May 31, 2016

(54) SYSTEM, METHOD AND/OR DEVICES FOR ALIGNING A MOVEMENT PATH WITH AN INDOOR ROUTING GRAPH

(71) Applicant: QUALCOMM Incorporated, San Diego, CA (US)

(72) Inventors: Hui Chao, San Jose, CA (US); Saumitra Mohan Das, Santa Clara, CA (US); Jiajian Chen, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/132,887

(22) Filed: Dec. 18, 2013

(65) Prior Publication Data

US 2015/0168159 A1    Jun. 18, 2015

(51) Int. Cl.
| G01C 21/26 | (2006.01) |
| G01C 21/30 | (2006.01) |
| G01C 21/36 | (2006.01) |
| G01C 21/16 | (2006.01) |
| G01C 21/20 | (2006.01) |
| G01C 21/28 | (2006.01) |
| G01S 5/02 | (2010.01) |

(52) U.S. Cl.
CPC .............. *G01C 21/30* (2013.01); *G01C 21/165* (2013.01); *G01C 21/206* (2013.01); *G01C 21/28* (2013.01); *G01C 21/3676* (2013.01); *G01S 5/0252* (2013.01)

(58) Field of Classification Search
USPC ......................................... 701/400, 408, 428
See application file for complete search history.

(56) References Cited

U.S. PATENT DOCUMENTS

| 8,160,397 | B1 | 4/2012 | Wu |
| 2006/0129308 | A1 | 6/2006 | Kates |
| 2009/0055090 | A1 | 2/2009 | Cowley et al. |
| 2009/0326815 | A1 | 12/2009 | Williamson et al. |
| 2010/0061601 | A1 | 3/2010 | Abramoff et al. |
| 2010/0097269 | A1* | 4/2010 | Loidl et al. ..................... 342/378 |
| 2010/0103036 | A1 | 4/2010 | Malone et al. |
| 2011/0280453 | A1 | 11/2011 | Chen et al. |
| 2012/0084004 | A1 | 4/2012 | Alexandre et al. |
| 2012/0114202 | A1 | 5/2012 | Manson |
| 2012/0150440 | A1 | 6/2012 | Sambongi |

(Continued)

FOREIGN PATENT DOCUMENTS

| WO | WO-2013057730 A1 | 4/2013 |
| WO | WO-2013074352 A1 | 5/2013 |

OTHER PUBLICATIONS

International Search Report and Written Opinion—PCT/US2014/070425—ISA/EPO—Mar. 30, 2015.

(Continued)

*Primary Examiner* — Yonel Beaulieu
(74) *Attorney, Agent, or Firm* — Berkeley Law & Technology Group, LLP

(57) ABSTRACT

Disclosed are systems, methods, and devices for aligning a path of movement of a mobile device with an indoor routing graph. In one particular embodiment, a mobile device may trace a path of movement from a starting point to a point of intersection with a routing graph that defines feasible movement within an area. Responsive to a detecting a point of intersection, a mobile device may estimate a contiguous route from one or more locations of the routing graph to a starting point.

30 Claims, 8 Drawing Sheets

(56) References Cited

U.S. PATENT DOCUMENTS

2012/0274642 A1 11/2012 Ofek et al.
2012/0323485 A1 12/2012 Mutoh

OTHER PUBLICATIONS

Li, M., et al., "Vision-aided Inertial Navigation for Resource-constrained Systems", IEEE/RSJ International Conference on Intelligent Robots and Systems, Oct. 7-12, 2012, pp. 1057-1063.

* cited by examiner

SYSTEM, METHOD AND/OR DEVICES FOR ALIGNING A MOVEMENT PATH WITH AN INDOOR ROUTING GRAPH

BACKGROUND

1. Field

The subject matter disclosed herein relates to mobile electronic devices, and, more particularly, to methods, apparatuses, and/or articles of manufacture that may be used to align a user's outdoor path of movement with an indoor routing graph.

2. Information

The Global Positioning System (GPS) and other like satellite positioning systems (SPSs) have enabled navigation services for mobile handsets in outdoor environments. However, since satellite signals may not be reliably received and/or acquired in an indoor environment, different techniques may be employed to enable indoor navigation services. For example, a mobile device may typically obtain a position estimation by measuring ranges to three or more terrestrial wireless access points that may be positioned at known locations. Such ranges may be measured, for example, by obtaining a media access control identification (MAC ID) address from signals received from access points and measuring one or more characteristics of signals received from access points such as, for example, signal strength and round trip delay, just to name a couple of examples.

In some implementations, an indoor navigation system may provide a digital electronic map to a mobile device as the device enters an indoor area. Such a map may present indoor features such as doors, hallways, entryways, walls, etc. A digital electronic map of an indoor area, which may be obtained through selection of a universal resource locator (URL) accessible by a mobile device, for example, may also show points of interest (POIs) such as restaurants, cafés, stores, kiosks, restrooms, etc. Upon request by a user, a mobile device may overlay a routing graph on a digital map to show one or more possible user paths from a current location, for example, to one or more POIs. Thus, by presenting a digital map, and a routing graph overlaid upon a digital map, a mobile device user may be apprised of his or her current location and obtain directions from a current location to one or more POIs.

However, in many indoor locations, such as indoor parking structures that may adjoin with shopping malls, airports, stadiums, theaters, and other establishments, indoor mobile device positioning services and/or digital electronic maps may not be available. In such instances, especially upon returning to a particular location of a parking garage at the conclusion of an event, for example, a mobile device user may spend excessive time searching for a vehicle or other location as the user attempts to exit the parking structure and return home. These situations can represent sources of frustration as tired shoppers, concertgoers, and other mobile device users try and remember markers that may help guide them through a parking structure to specific locations without the benefit of mobile device positioning assistance.

SUMMARY

Briefly, particular implementations may include a method comprising, at a mobile device: tracing a path of movement of the mobile device from a starting point. The method may further comprise detecting an intersection of the traced path of movement with one or more locations of a routing graph defining feasible movement within an area, and estimating a contiguous route from the one or more locations of the routing graph to the starting point based, at least in part, on the detected intersection and the traced path of movement.

Another particular implementation may be directed to a mobile device comprising at least one sensor to generate one or more signals responsive to movement of the mobile device. The mobile device may further comprise one or more processors to trace a path of movement of the mobile device from a starting point, detect an intersection of the traced path of movement with one or more locations of a routing graph defining feasible movement within an area and estimate a contiguous route from the one or more locations of the routing graph to the starting point based, at least in part, on the detected intersection and the traced path of movement.

Another particular implementation may be directed to a mobile device comprising at least one sensor to generate one or more signals responsive to movement of the mobile device, and one or more processors to trace a path of movement of the mobile device from a starting point detect an intersection of the traced path with one or more locations of a routing graph defining feasible movement within an area and estimate a contiguous route from the one or more locations of the routing graph to the starting point based, at least in part, on the detected intersection and the traced path of movement.

Another particular implementation may be directed to an apparatus comprising means for tracing a path of movement of a mobile device from a starting point, means for detecting an intersection of the traced path of movement with one or more locations of a routing graph defining feasible movement within an area, and means for estimating a contiguous route from the one or more locations of the routing graph to the starting point based, at least in part, on the detected intersection and the traced path of movement.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
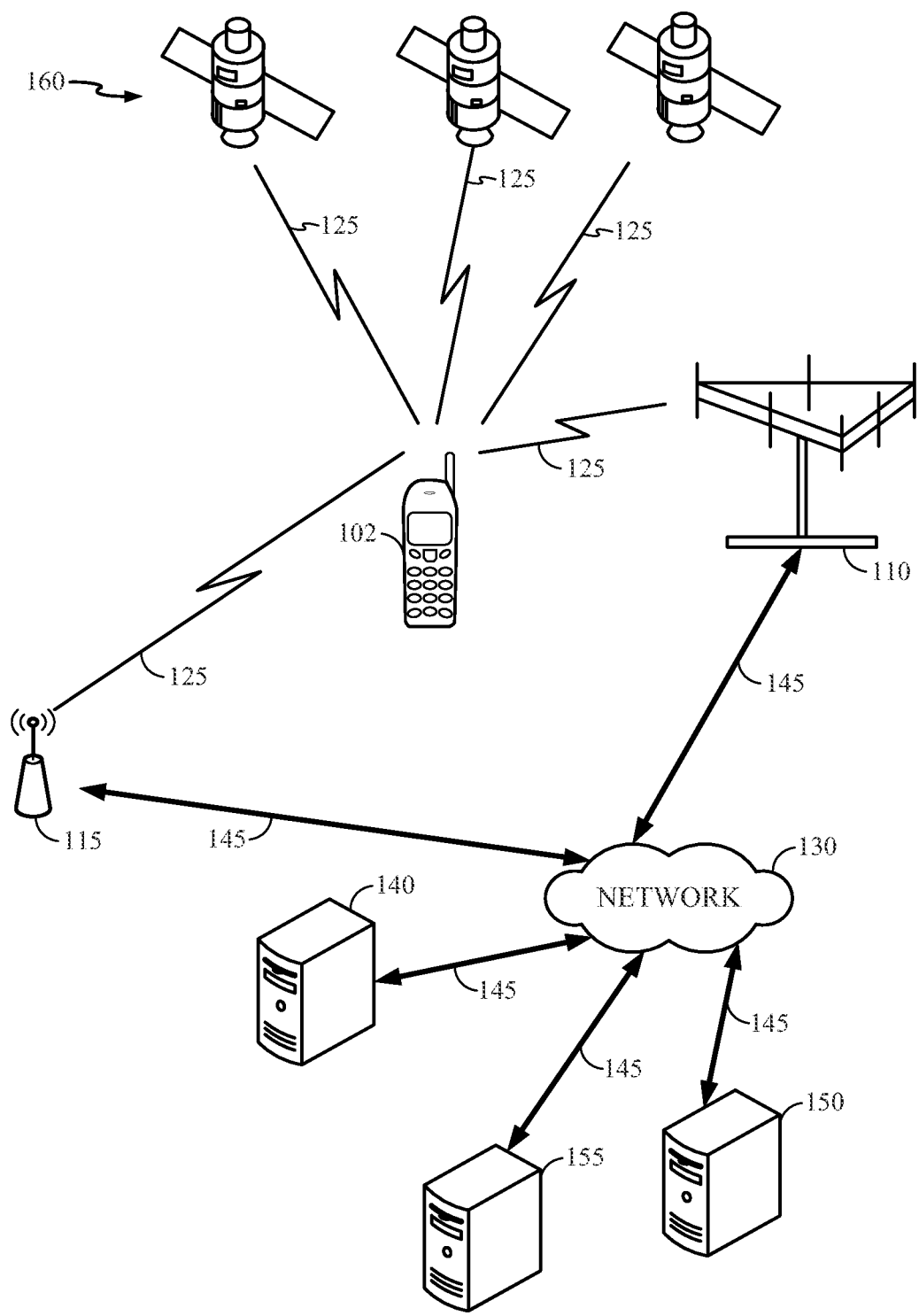
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms, may be used interchangeably and may refer to any kind of special-purpose computing platform or apparatus that may from time to time occupy a position that changes. In some instances, a mobile communication device, for example, may be capable of communicating with other devices, mobile or otherwise, through wireless transmission or receipt of information according to one or more communication protocols. As a way of illustration, special-purpose mobile communication devices, which may herein be referred to simply as "mobile devices," may include, for example, cellular telephones, smart telephones, personal digital assistants, laptop computers, personal entertainment systems, tablet personal computers, personal audio or video devices, personal navigation devices, or the like. It should be appreciated, however, that these are merely examples of mobile devices that may be used, at least in part, to implement one or more operations and/or techniques for displaying digital maps, such as digital maps of an indoor area, on a mobile device, for example, and that claimed subject matter is not limited in this respect. It should also be noted that the terms "position" and "location" may be used interchangeably herein.

As used herein, the term "point of interest" or "POI" may refer to a specific useful or interesting location on a digital map or other type of diagrammatic representation of an area showing physical features. Thus, in a shopping mall, for example, POIs may comprise bathrooms, conference and/or meeting rooms, department stores, boutiques, kiosks, elevators, escalators, staircases, restaurants, or the like, which may be overlaid on a digital map of a shopping mall, stadium, town square, amphitheater, parking garage, amusement park, or other area. An electronic digital map may, for example, be stored at a suitable server and may be wirelessly accessible by a mobile device, such as via a selection of a Uniform Resource Locator (URL), for example. By obtaining a digital map of an indoor or like area of interest, a mobile device may, for example, be capable of overlaying its current estimated location on the displayed map of the area so as to provide a user with additional context, frame of reference, or the like.

Also as used herein, the term "routing graph" may represent one or more paths of feasible movement that a mobile device user may traverse. In some implementations, a routing graph may represent numerous paths of feasible movement without representing any particular paths of movement that a user may traverse to arrive at, for example, a destination POI. In other implementations, a routing graph may be overlaid on an electronic digital map, thereby indicating a particular route, comprising turn-by-turn directions, in relation to features indicated on a digital map, which may be used to direct a user to a destination. A routing graph may comprise visual indicators displayed on an electronic digital map, and/or may comprise audible indicators, that direct or suggest that a mobile device user should turn to the left or to the right, traverse in a forward direction, climb or descend a staircase, or enter a designated area, just to name a few examples, and claimed subject matter is not limited in this regard.

At times, a mobile device user may be interested in locating, for example, a POI within, for example, a large shopping mall, an airport, or other complex structure. Within a complex structure, a mobile device may be capable of communicating with wireless access points dispersed at various locations within the complex structure. Thus, as previously mentioned, a mobile device may evaluate characteristics of signals received from one or more access points located throughout the structure. A mobile device may measure, for example, signal parameters such as round-trip delay, received signal strength, and/or other characteristics in a manner that enables a mobile device to estimate its location relative to one or more access points. An estimated location may be indicated at a location on a digital map transmitted to a mobile device by way of a wireless communications channel. A route graphing application operating on the mobile device may present one or more routes to a mobile device user, which may provide the user with turn-by-turn routing commands to direct the user to one or more destination POIs, for example.

In some instances, a mobile device user may enter a shopping mall, airport, or other complex POI by way of an underground or aboveground parking structure, within which position estimation using wireless access points, for example, may not be available. In such instances, a mobile device user may attempt to memorize a level, row, space number, and/or any other identifying feature that may enable guiding a mobile device user in returning to his or her vehicle at the end of a shopping trip or other event. However, upon attempting to return to the user's vehicle in large parking structure, for example, a user may become confused and/or disoriented. Such confusion and/or disorientation may be in response to, for example, a formerly empty parking garage now being completely full of vehicles. Confusion and/or disorientation may also occur, for example, if a user returns to an aboveground parking structure illuminated by evening streetlights that appears very different from a parking structure illuminated by morning sunlight. A mobile device user returning to a vehicle in a parking structure may become confused and/or disoriented for other reasons, and claimed subject matter is not limited in this respect.

In embodiments, such confusion and/or disorientation experienced by a mobile device user returning to a starting point, such as a user's vehicle in a parking structure, may be avoided by aligning a mobile device user's path of movement with an indoor routing graph. In particular embodiments, a user's movement within a parking garage, or other location within which a mobile device may not be capable of obtaining a position estimation, may be tracked and/or estimated by way of a user's mobile device. As a user departs from a starting point, a processor coupled to one or more accelerometers, pedometers, magnetometers, barometric pressure sensors, and/or other instrument may store in a memory device, for example, a "trace" that may be used to construct a user's path of movement. A trace may represent a mobile device user's complex motion vector as the user strolls within an area within which a mobile device may not be capable of obtaining a position estimation. In certain embodiments, an image sensor may be used to enhance and/or aid output signals from other sensors, to obtain a more accurate path of movement, for example.

If the user enters an indoor environment, a mobile device may detect an intersection of a traced path of movement with one or more locations of a routing graph that defines feasible movement within an indoor area, such as an indoor area corresponding to a shopping mall, airport, amphitheater, etc. Responsive to detection of an intersection, a processor, of a mobile device may estimate a contiguous route from one or more estimated locations of the routing graph to a starting point of the traced path. It should be noted that additional criteria may give rise to estimating a contiguous route from one or more locations of a routing graph to a starting point, and claimed subject matter is not limited in this respect.

In embodiments, responsive to detecting an intersection of a traced path of movement with one or more locations of a routing graph, a mobile device may suspend operation of at least one sensor of a mobile device. Suspending operation of at least one sensor and/or a signal processor of a mobile device may bring about power savings as well as permit a mobile device to reduce its demand for signal processing resources. If operation of at least one sensor and/or a signal processor of a mobile device are suspended, a mobile device may accurately estimate its current location by obtaining a MAC ID address from signals received from wireless access points. Positioning estimates may also be derived by measuring one or more characteristics of signals received from access points such as, for example, signal strength, round trip delay, just to name a few examples. A traced path of movement may be merged with a routing graph and presented to a mobile device user by way of a display device. An estimated location of a user's mobile device may be rendered on a display device along with, for example, a confidence region. A display device may render additional user positioning details and claimed subject matter is not limited in this respect.

Figure 6:
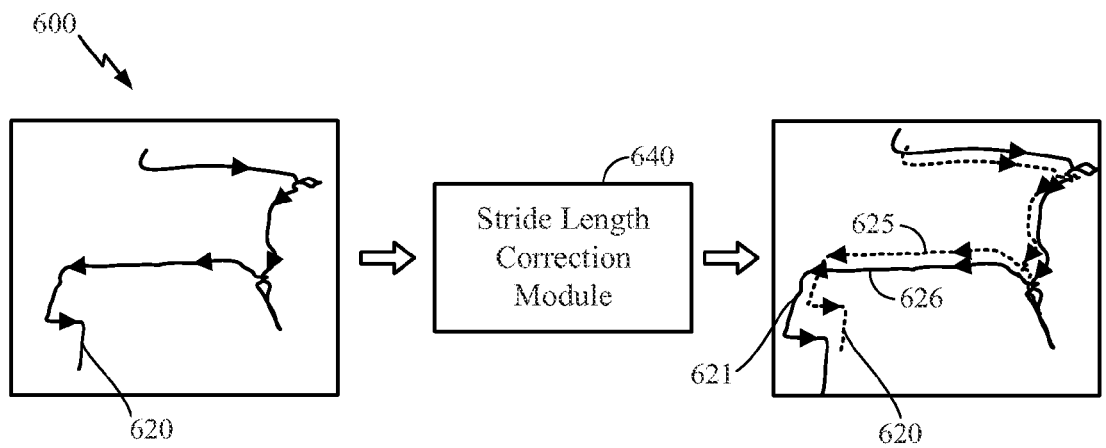
FIG. 6 is a schematic diagram illustrating modification of a path of movement responsive to stride length correction in a mobile device according to an embodiment.

In certain embodiments, a mobile device may compare one or more sensor output signals, such as an accelerometer trace, with a computed velocity derived with the assistance of an indoor position estimation technique. A comparison of a computed velocity derived from one or more sensor output signals with a computed velocity derived from an indoor position estimation technique may permit a mobile device to generate one or more corrections to an estimated value of a mobile device user's stride length. Responsive to computing a corrected estimate of stride length, a processor of a mobile device may increase, decrease, or otherwise modify a length of at least a portion of a contiguous route, as shown in FIG. 6, herein. A contiguous route may comprise, for example, a traced path of movement through an area within which a mobile device may not be capable of obtaining a position estimation. A corrected estimate of a user's stride length may be employed for other types of operations, and claimed subject matter is not limited in this respect.

In one or more embodiments, a user may select to modify a return path from a current estimated location to a starting point in an area within which a mobile device may not be capable of estimating its position. For example, mobile device user may select to modify a return path to allow the user to travel along a more direct path from a current estimated location to a starting point. Thus, a user traversing a circuitous path through a parking garage toward a shopping mall entrance, for example, may quickly and efficiently return to a starting point after a day of shopping, for example.

FIG. 1 is a schematic diagram of a network topology 100 according to an embodiment. As described below, one or more processes or operations for aligning a user's path of movement with an indoor routing graph may be implemented in a signal environment that may be utilized by a mobile device 102, for example. It should be appreciated that network topology 100 is described herein as a non-limiting example that may be implemented, in whole or in part, in the framework of various communications networks or combination of networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as airport terminals, multilevel shopping malls, amphitheaters, rooftop gardens, patios, or the like. At times, one or more operations or techniques described herein may be performed, at least in part, in an outdoor environment.

As illustrated, network topology 100 may comprise, for example, one or more space vehicles 160, base transceiver station 110, wireless transmitter 115, etc. capable of communicating with mobile device 102 via wireless communication links 125 in accordance with one or more protocols. Space vehicles 160 may be associated with one or more satellite positioning systems (SPS), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Base transceiver station 110, wireless transmitter 115, etc. may be of the same or similar type, for example, or may represent different types of devices, such as access points, radio beacons, cellular base stations, femtocells, or the like, depending on an implementation. At times one or more wireless transmitters, such as wireless transmitters 115, for example, may be capable of transmitting and receiving wireless signals.

In some instances, one or more base transceiver stations 110, wireless transmitters 115, etc. may, for example, be operatively coupled to a network 130. Network 130 may comprise one or more wired or wireless communications or computing networks capable of transmitting messages including items, such as an electronic digital map, via one or more wireless communication links 125, 145, and so forth. As discussed below, items transmitted in messages may include, for example, an electronic digital map (e.g., floor plans, etc.) depicting features of an indoor or like area of interest (e.g., a shopping mall, retailer outlet, etc.) Items such as digital maps may be provided to a mobile device by a map server, such as one or more of servers 140, 150, and 155, at or upon entering the area. In particular implementations, an electronic digital map may be provided to a mobile device by a map server to provide navigation assistance in an indoor area of interest, for example. Responsive to receipt of one or more input signals from a user interface, a mobile device may plot or overlay a routing graph on an electronic digital map in a manner that provides turn-by-turn instructions to direct a mobile device user to and from locations within an indoor area of interest. A mobile device user's path movement through an area within which a mobile device may not be capable of obtaining a position estimation, such as an underground or aboveground parking structure, may be merged with a routing graph, which may, for example, permit a user to easily locate a starting point. A mobile device may perform other operations, such as those described herein.

Even though a certain number of computing platforms or devices are illustrated herein, any number of suitable computing platforms or devices may be implemented to facilitate or otherwise support one or more techniques or processes associated with network topology 100. For example, at times, network 130 may be coupled to one or more wired or wireless communications networks (e.g., Wi-Fi, etc.) so as to enhance a predominantly indoor coverage area for communications with mobile device 102, one or more base transceiver stations 110, wireless transmitters 115, servers 140, 150, 155, or the like. In some instances, network 130 may facilitate or support femtocell-based operative regions of coverage, for example. Again, these are merely example implementations, and claimed subject matter is not limited in this regard.

Figure 2:
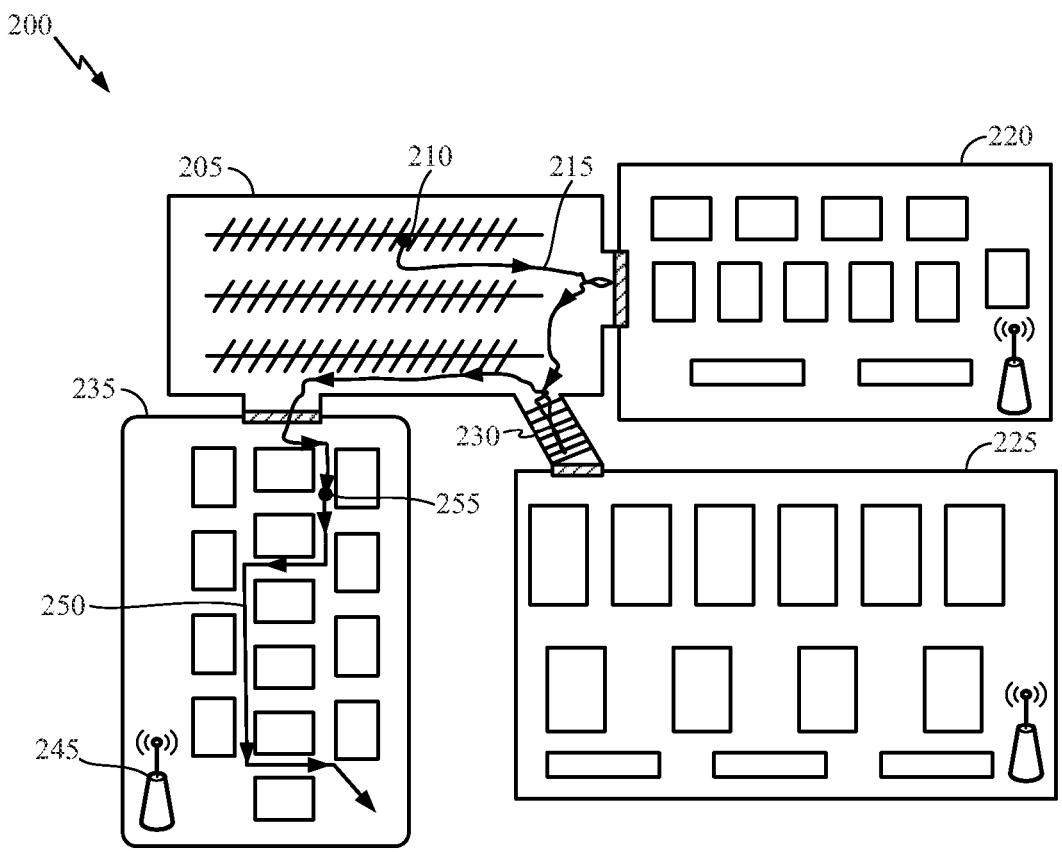
FIG. 2 is a schematic diagram of an indoor or underground parking structure that adjoins a shopping mall wherein one or more embodiments may be practiced.

FIG. 2 is a schematic diagram 200 of an indoor or underground parking structure that adjoins a shopping mall wherein one or more embodiments may be practiced. In FIG. 2, a mobile device user may originate at starting point 210 located within parking garage 205, for example. Starting point 210 may represent a particular automobile parking spot, motorcycle parking spot, or any other location at which a user may leave a vehicle for use at a later time, such as to return home, return to work, and so forth. It should be noted that starting point 210 may represent any point location, such as a location within a parking garage, and claimed subject matter is not intended to be limited in this respect.

In certain implementations, as a mobile device user traverses from starting point 210 towards shopping mall wing 220, a user's mobile device may begin sensing movement, which may comprise sensing displacement, velocity, acceleration, changes in barometric pressure, and so forth. In particular implementations, a user's mobile device may begin sensing movement responsive to one or more triggering mechanisms and/or signals such as sensing deceleration of an automobile, for example. Other triggering mechanisms may comprise a user's initiating a movement such as walking, running, standing, and so forth, and claimed subject matter is not limited in this respect. In particular embodiments, a mobile device may comprise one or more three-axis accelerometers capable of sensing acceleration in an X, Y, and/or Z direction, for example. A mobile device may include one or more processors for performing integrations, which may compute velocities and displacements in X, Y, and/or Z directions. As described further herein, a mobile device may comprise a memory, coupled to one or more processors by way of an appropriate bus structure, to permit storage of information states that correspond to output signals from one or more accelerometers as functions of time, for example. It should be noted that a mobile device may include different sensor capabilities or may utilize one or more of X, Y, and Z accelerometers differently, and claimed subject matter is not limited in this respect.

In particular embodiments, a mobile device may trace a path of movement from a starting point, such as starting point 210, as a mobile device user meanders from a starting point to a destination. For example, a mobile device user may begin at starting point 210; move in the direction of shopping mall wing 220, circle about, and then move in the direction of staircase 230, which may include traversing up-and-down at least a portion of staircase 230, which may lead to shopping mall wing 225. As shown in FIG. 2, a user may continue in the direction of an entrance of shopping mall wing 235, for example. Of course, a user may choose a large number of direct or meandering paths of movement other than path of movement 215 shown in FIG. 2, and claimed subject matter is not so limited.

If a mobile device user enters shopping mall wing 235, for example, a mobile device may detect a presence of one or more Wi-Fi access points, such as representative wireless access point 245, for example. Additional access points similar to representative wireless access point 245 may be situated at various locations around shopping mall wing 235. Thus, representative wireless access point 245 may indicate that a suitable number of access points and/or other positioning aids may be present within shopping mall wing 235. Shopping mall wing 235 may be equipped with any number of wireless access points, such as two, three, four, and so forth. In some embodiments, a mobile device may perform accurate position estimation if a mobile device is capable of acquiring signals from three or more access points, for example.

Upon or perhaps after entering shopping mall wing 235, a mobile device may acquire signals from, for example, representative wireless access point 245 while the mobile device is located at intersecting point 255, which intersects path of movement 215. Responsive to a mobile device acquiring an appropriate number of signals from wireless access points, a mobile device may suspend operation of one or more sensors. For example, a mobile device may suspend operation of sensors such as accelerometers, pedometers, barometric pressure sensors, magnetometers, gyroscopes, and so forth, thereby enabling conservation of battery and/or computer processing resources. Suspending operation of one or more sensors may give rise to additional benefits, and claimed subject matter is not limited in this respect. If operation of one or more sensors is suspended, a mobile device user may continue traversing along routing graph 250 within shopping mall wing 235 towards a destination.

Figure 3:
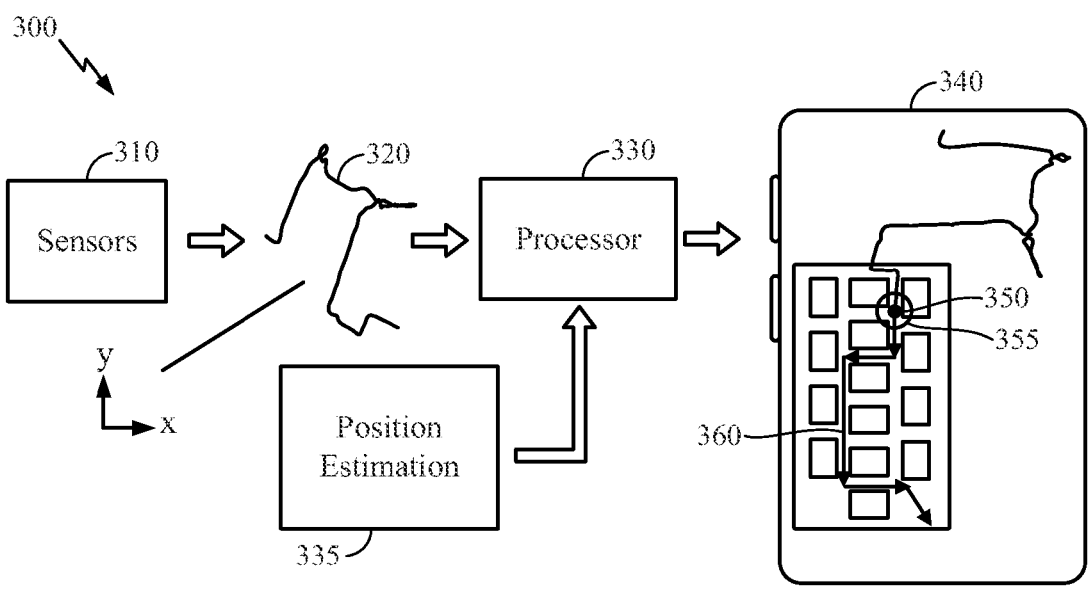
FIG. 3 is a schematic diagram illustrating an output trace from one or more sensors of a mobile device responsive to device movement according to an embodiment.

FIG. 3 is a schematic diagram 300 illustrating an output trace from one or more sensors of a mobile device responsive to device movement according to an embodiment. In one possible example, sensors 310 represent one or more sensors of a mobile device carried by a user as the user traverses an area within which a mobile device may not be capable of obtaining a position estimation, such as parking garage 205 of FIG. 2. In response to movement of a mobile device, sensors 310 may produce two-dimensional output trace 320, which may be oriented in an X-Y plane, for example. Sensors 310 may produce an output trace oriented in additional dimensions, such as a three-dimensional X-Y-Z space, and claimed subject matter is not limited in this respect.

In embodiments, sensors 310 may generate output trace 320 responsive to movement of a mobile device. In embodiments, sensors 310 may arbitrarily orient trace 320 in the X-Y plane, perhaps in response to sensors 310 being unable to discern movement in one or more particular absolute directions (such as North, South, East, and/or West). Accordingly, a path of movement represented by output trace 320 may be unlikely to correspond to a mobile device user's movement within an absolute (e.g., North/South/East/West) coordinate frame. Thus, although illustrated in a particular orientation, output trace 320 may assume any orientation in an X-Y-Z space, and claimed subject matter is not limited in this respect.

If a mobile device user enters an indoor area within which positioning signals may be acquired, such as by way of acquiring signals from representative wireless access point 245 of FIG. 2, position estimation may be performed by a position estimation process 335, for example. Responsive to receiving a position estimate, processor 330 may initiate an indication of an estimated position of a mobile device on display device 340. In the example of FIG. 3, point 350 may be rendered on display device 340 showing a relative position of a mobile device, and an associated user, within a shopping mall wing. In some implementations, confidence region 355 may surround point 350. Confidence region 355 may be used to indicate, for example, a particular level of confidence that a mobile device is located within the confidence region. In one example, a confidence region, such as confidence region 355 may indicate a 95% level of confidence that a mobile device is located within the region. In other examples, a confidence region may be used to indicate a different level of confidence that a mobile device is within the region, such as 50%, 75%, 90%, and so forth, and claimed subject matter is not limited in this respect.

If a position of a mobile device can be accurately estimated, a routing graph, such as routing graph 360 defining feasible movement within, for example, shopping mall wing 235 of FIG. 2, may be plotted beginning at point 350. In embodiments, routing graph 360 may be plotted beginning at point 350 in a manner that joins or merges routing graph 360 with path of movement 215 of FIG. 2. Accordingly, display device 340 may present a contiguous route beginning from a starting point, such as starting point 210 of FIG. 2, continuing along path of movement 215, and joining with routing graph 360.

Figure 4:
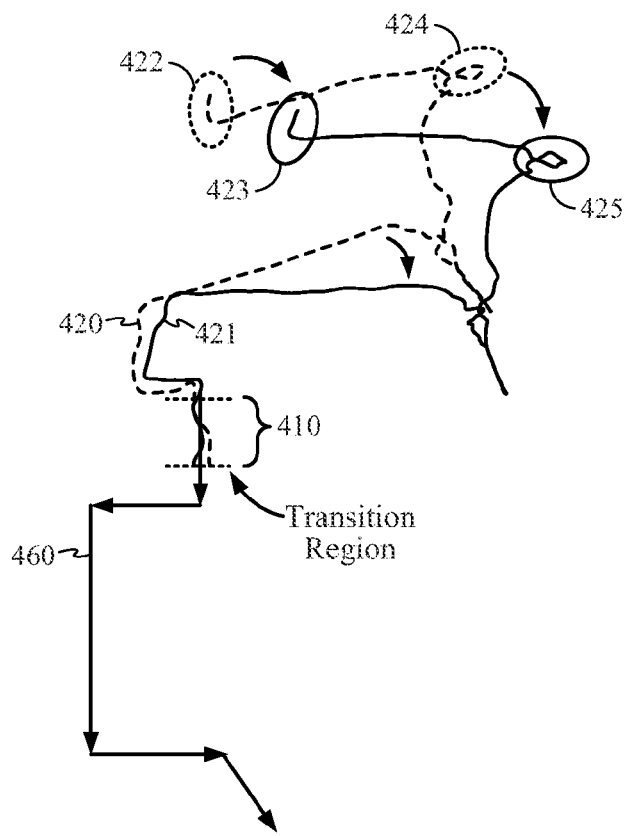
FIG. 4 is a schematic diagram illustrating an output trace from one or more sensors of a mobile device being rotated into alignment with a routing graph according to an embodiment.

FIG. 4 is a schematic diagram 400 illustrating an output trace from one or more sensors of a mobile device being rotated in a plane (e.g., an X-Y plane) to align with a routing graph according to an embodiment. To illustrate, output trace 420 may represent an output trace from one or more sensors, such as accelerometers, that may trace a mobile device user's path of movement through an area within which a mobile device may not be capable of obtaining a position estimation. As previously alluded to, an output trace may be initially arbitrarily oriented, perhaps in response to sensors and/or computer processors being unable to discern movement in one or more particular absolute directions (such as North, South, East, and/or West). However, as a user enters an indoor environment, wherein positioning signals may be acquired by a user's mobile device, a mobile device may suspend operation of one or more sensors and transition to utilizing position assistance from, for example, wireless access points. In other embodiments, a mobile device may suspend operation of one or more sensors for other reasons, and claimed subject matter is not limited in this respect.

In FIG. 4, for example, transition region 410 may indicate an area within which a mobile device may trace a user's path of movement simultaneously with acquiring positioning signals from, for example, one or more wireless access points. In particular embodiments, if a mobile device acquires positioning signals suitable for computing an estimated position, a mobile device may suspend operation of one or more sensors. Such suspension may occur, for example, after a mobile device aligns a traced path of movement with an indoor routing graph. Thus, in FIG. 4, for example, as a mobile device user traverses within transition region 410, a mobile device may determine that a portion of a user's path of movement coincides with a routing graph, such as routing graph 460. In particular embodiments, if at least one point of sensor output trace 420 intersects with estimated locations of routing graph 460, for example, sensor output trace 420 may be matched with routing graph 460. Additionally, if at least two points of sensor output trace 420 may coincide with estimated locations of routing graph 460, sensor output trace 420 may be rotated in a plane to align an end portion of a path of movement with a beginning portion of a routing graph.

As additional points of sensor output trace 420 within transition region 410 are determined to coincide with routing graph 460, the orientation of output trace of 420 may be adjusted. In FIG. 4, for example, sensor output trace 420 may be adjusted into place, as represented by output trace 421. As output trace 420 is adjusted, feature 422 may be adjusted into a position corresponding to feature 423 and feature 424 may be adjusted into a position corresponding to feature 425. Other features of output trace 420 may also be adjusted, and claimed subject matter is not limited to any particular number of features, sizes of features, or the like.

In particular embodiments, a mobile device may prompt a user, for example, to move to a position at which a mobile device may obtain a more accurate estimate of location. For example, if at least a portion of transition region 410 corresponds to a hallway or other area within which feasible movement is limited, a mobile device may be capable of computing an accurate estimate of position. In such instances, a mobile device may direct a user to such a position so that an indoor routing graph may be aligned with a user's path of movement.

Figure 5:
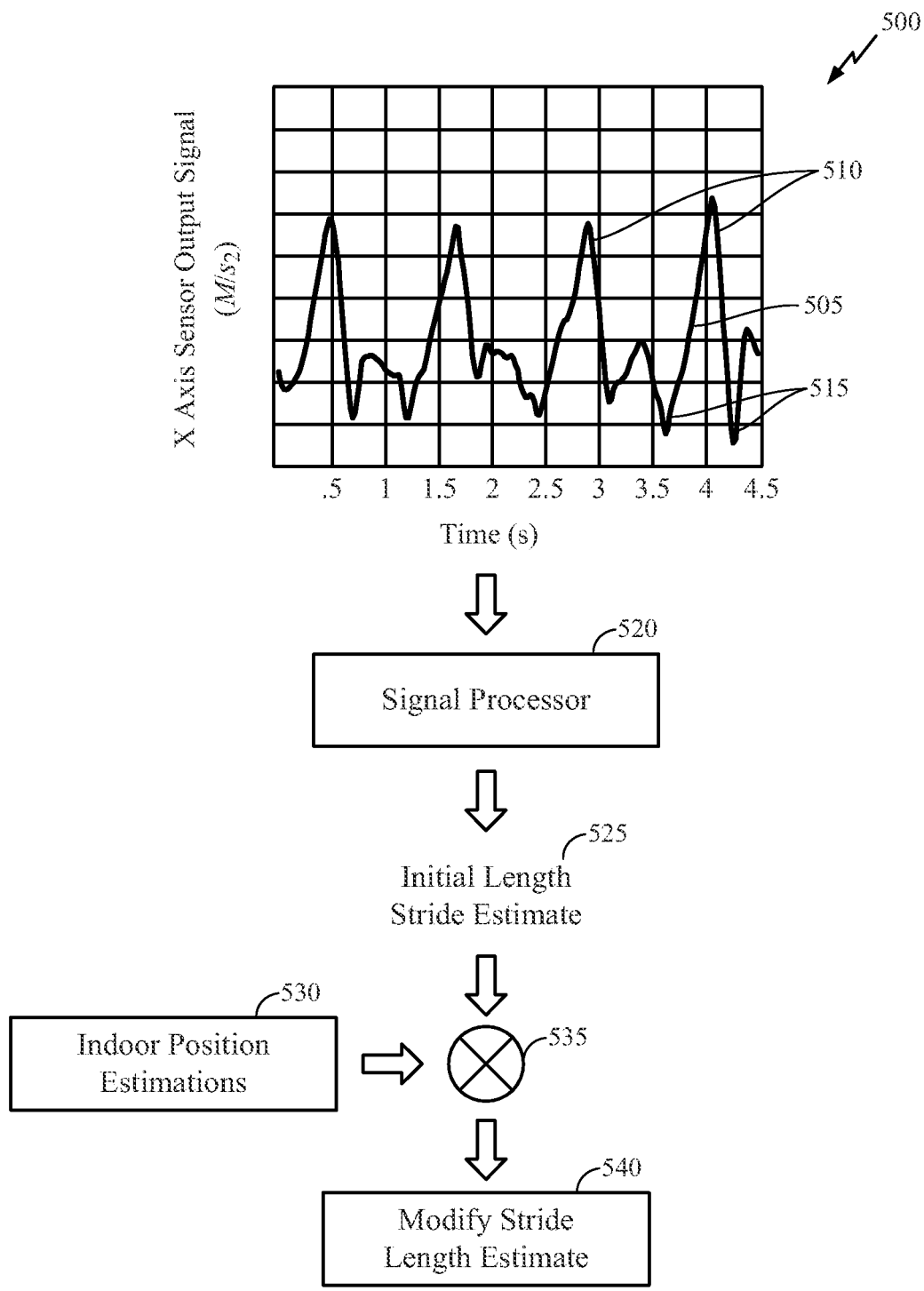
FIG. 5 is a schematic diagram illustrating a process for stride length correction in a mobile device according to an embodiment.

FIG. 5 is a schematic diagram 500 illustrating a process for stride length correction in a mobile device according to an embodiment. Near the top portion of FIG. 5, sample output signal plot 505 of an X-axis accelerometer is plotted as a function of time. It can be discerned from sample output signal plot 505 that as a mobile device user walks, perhaps while carrying a mobile device in the user's hand, the device appears to undergo approximately periodic acceleration and the X-axis. From sample output signal plot 505, it may be appreciated that one or more features of an acceleration profile may be utilized to infer that a user may be walking in a forward direction. For example, one or more of local maxima 510 and/or local minima 515 may indicate a user is currently walking, such as through parking garage 205 of FIG. 2, up or down staircase 230, and so forth. It may be appreciated that a mobile device may undergo additional accelerations, such as acceleration in one or more of the Y-axis and the Z-axis directions, and claimed subject matter is not limited to accelerations in any particular axis. For example, in an embodiment, the vertical axis of FIG. 5 may correspond to magnitude of accelerations in three dimensions, such as the X, Y, and Z dimensions, which may be expressed as:

$$\text{Magnitude} = \sqrt{X_{accel}^2 + Y_{accel}^2 + Z_{accel}^2}. \tag{1}$$

It should be pointed out, however, that if a mobile device is situated in a user's backpack, purse, coat or pants pocket, while the user is walking, the mobile device may undergo an entirely different acceleration profile and claimed subject matter is not so limited.

In embodiments, output signal plot 505 may be utilized by a processor of a mobile device, for example, to estimate a user's path of movement in an area within which a mobile device may not be capable of obtaining a position estimation. For example, an X-axis acceleration profile may be integrated over time twice by signal processor 520 to form initial stride estimate 525. In embodiments, a stride estimate may be employed to estimate a path of movement from a sensor output trace. However, such mathematical manipulations of sensor output accelerations may give rise to significant errors in the computation of velocity. Further, mathematical manipulations of velocity may give rise to even more significant errors in the computation of displacement as reflected in an output trace, for example. Errors in computing of output traces may result from additional sources and claimed subject matter is not limited in this respect.

Returning to FIG. 5, at 530 a mobile device may perform indoor position estimations. In embodiments, indoor position estimations may be obtained from accessing Wi-Fi signals, for example, in an indoor area such as a shopping mall, amphitheater, or other indoor or partially indoor venue. In particular embodiments, a mobile device may perform position estimations at times that correspond with one or more of local maxima 510 and/or one or more of local minima 515. Initial stride estimates 525 may be determined by a mobile device, perhaps by counting a number of local maxima 510 and/or local minima 515 that occur between position estimations obtained from Wi-Fi signals. If a mobile device correlates position estimations with local maxima and/or local minima, a mobile device may accurately estimate a stride length of a co-located user walking in a particular direction. Position estimations may be combined with initial stride estimates 525 using combiner 535. This may permit a processor of a mobile device to generate corrections to estimates of a mobile device user's stride length at 540. It should be noted that corrections to estimates of a mobile device user's stride length may be computed by way of a variety of techniques and/or approaches, and claimed subject matter is not limited in this respect.

In particular embodiments, a mobile device user's path of movement may be initially estimated assuming an average or nominal stride length. In one example, if a mobile device user's stride length is estimated to be approximately 0.65 meters, then a time between successive local maxima, such as between any two of local maxima 510, may indicate that the user has traversed a distance of approximately 0.65 meter. However, if a user's stride length is more correctly estimated to be approximately 0.75 meters, which represents an increase of approximately 15.4%, then a time between any two successive local maxima 510 may indicate that the user has traversed a distance of approximately 0.75 meter. Accordingly, a corrected estimate of a user's stride length suggests that portions of a user's path of movement should be increased by approximately 15.4%.

FIG. 6 is a schematic diagram 600 illustrating modification of a path of movement responsive to correction of a stride length estimation of a mobile device user according to an embodiment. In FIG. 6, a sensor output trace may represent a mobile device user's path of movement through an area within which a mobile device may not be capable of obtaining a position estimation, such as within an underground or aboveground parking structure. In an embodiment, a stride length correction module may perform, or at least assist in performing, a process such as that described in FIG. 5. In accordance with FIG. 5, a mobile device user's path of movement may be corrected by correlating one or more of local minima and/or local maxima in X-axis acceleration with position estimations obtained with assistance from one or more indoor positioning aids, such as Wi-Fi access points. As shown from FIG. 6, a mobile device user's path of movement may be modified, such as from path of movement 620 to 621 according to output signals from stride length correction module 640. Modifications and/or corrections to a user's path of movement may comprise increasing or decreasing one or more contiguous portions of a user's path movement. For example, responsive to output signals from stride length correction module 640, section 625 of path of movement 620 may be increased in length to form section 626. Likewise, other portions of path of movement 620 may be decreased responsive to output signals from stride length correction module 640, or may undergo other modifications, and claimed subject matter is not limited in this respect.

In particular embodiments, a mobile device may be equipped with an image sensor, such as a camera, or other type of imaging device. In particular embodiments, a mobile device may capture one or more images while a user is traversing through an area within which a mobile device may not be capable of obtaining a position estimation. One or more captured images may be analyzed by a mobile device using, for example, key point recognition, in which a captured image of a feature may be correlated with a known location of the feature. In one example, a mobile device tracing a user's movement by way of one or more sensors may capture an image of a staircase within a parking garage and, at least partially responsive to correlating a captured image with a known location, may adjust a display presenting a user's path of movement. In another example, a captured image of an entrance to a parking garage may permit a mobile device to modify a portion of a path of movement to be proximate with the parking garage entrance. Captured images may be used to assist in other modifications of a path of movement, and claimed subject matter is not limited in this respect.

Figure 7A:
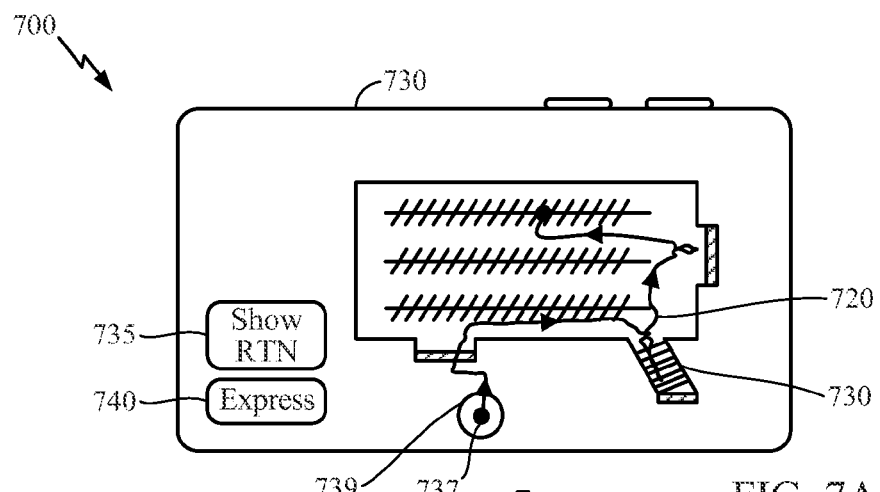
FIGS. 7A and 7B are schematic diagrams illustrating path of movement modification in response to a user input according to an embodiment.
Figure 7B:
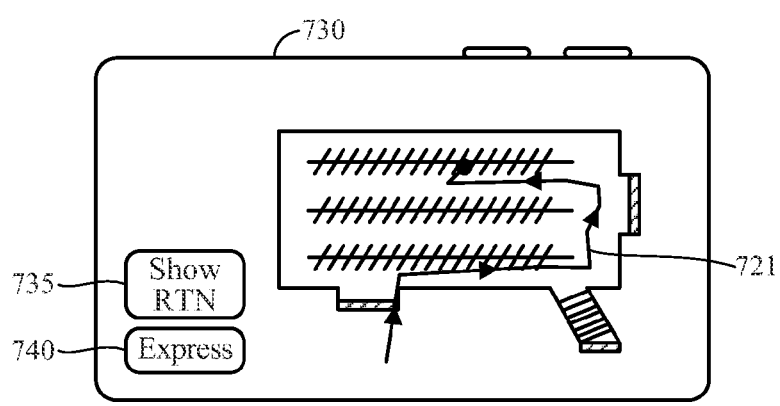

FIGS. 7A and 7B are schematic diagrams 700 illustrating path of movement modification response to a user input according to an embodiment. In FIG. 7A, path of movement 720 may represent, for example, a user's return path through a parking garage to a starting point. In embodiments, a mobile device may present a selection, such as selection 735, which may bring about a rendering of a return path to a starting point. In at least some embodiments, current estimated position 737 and confidence region 739 of a mobile device may be presented along with return path of movement 720, for example.

In some instances, a mobile device user may favor a less circuitous return path from an exit door of an indoor area, through an area within which a mobile device may not be capable of obtaining a position estimation, to a starting point, such as illustrated in FIG. 7B. Thus, for the examples of FIGS. 7A and 7B, a mobile device may provide user selection 740 that may allow a display device to present a more direct or "express" path from an exit door of an indoor area, through an area within which a mobile device may not be capable of obtaining a position estimation, and to a starting point. In the example of FIG. 7A, if a user selects an express route, by way of user selection 740, path of movement 721 may be rendered in which, for example, one or more previous deviations, such as user's previous excursion up and down staircase 730 may be omitted, such as shown in FIG. 7B. A variety of other deviations from a direct route may also be omitted responsive to user selection of a express route to a starting point, and claimed subject matter is not limited in this respect.

Figure 8:
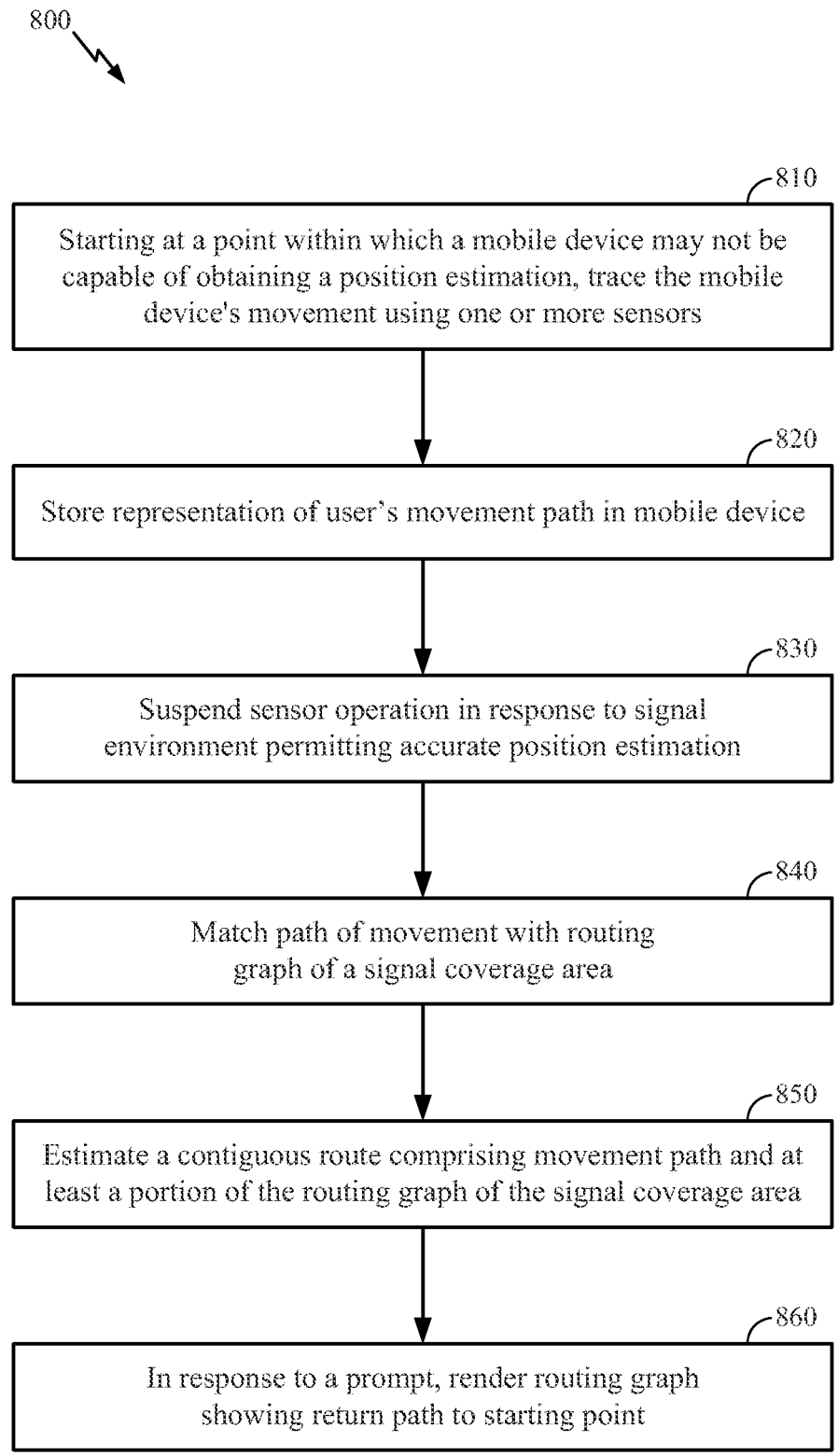

FIG. 8 is a flowchart 800 for a process of aligning a path of movement of a mobile device with an indoor routing graph according to an embodiment. Example implementations, such as those described in FIG. 8 and others herein, may include blocks in addition to those shown and described, fewer blocks, blocks occurring in an order different than may be identified, or any combination thereof. The method may begin at block 810, which may include starting at a point within an area wherein a mobile device may not be capable of obtaining a position estimation and tracing a mobile device's movement using one or more sensors. Sensors may include, for example, one or more accelerometers, one or more pedometers, one or more barometric pressure sensors, magnetometers, and so forth. At block 820, a mobile device may store a representation of a user's path of movement through an area within which a mobile device may not be capable of obtaining a position estimation, for example. At block 830, responsive to a mobile device detecting that a signal environment permits accurate position estimation, such as by way of acquiring signals from one or more wireless access points, a mobile device may suspend operation of one or more sensors. At block 840, a mobile device may match a path of movement with a routing graph of the signal coverage area, such as an indoor shopping mall, amphitheater, or other venue. In particular embodiments, block 840 may comprise matching a path of movement with a routing graph of the signal coverage area as described in reference to FIG. 3 herein. At block 850, a mobile device may estimate a contiguous route comprising a path of movement and at least a portion of the routing graph from the signal coverage area. In particular embodiments, block 850 may comprise estimating a contiguous route comprising a path of movement and a portion of a routing graph as described in reference to FIG. 4 herein. At block 860, perhaps responsive to a prompt, such as a user request, a mobile device may reverse a routing graph in a manner that may be used to guide a mobile device user back to a starting point. In particular embodiments, block 860 may comprise reversing a routing graph to guide a user to a starting point as described in reference to FIGS. 7A and 7B herein.

In other embodiments, a method may additionally comprise estimating a stride length of mobile device user walking in an indoor area and modifying a path of movement through an area within which a mobile device may not be capable of obtaining a position estimation. Modifying a path of movement may be enabled at least partially in response a mobile device computing corrections to a stride length estimate. Embodiments may also include, perhaps in response to a user selection, rendering a more direct path from an exit door of an indoor area, through an area within which a mobile device may not be capable of obtaining a position estimation, and to a starting point. A more direct path may comprise fewer deviations from a general direction of movement than are present in a user's original path of movement.

Figure 9:
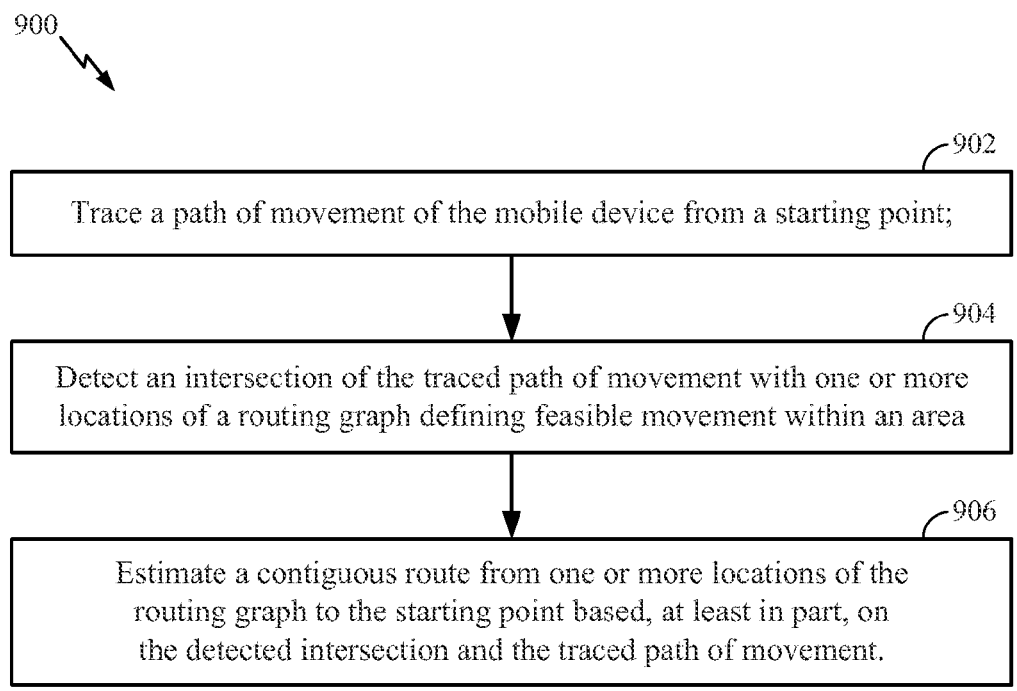
FIGS. 8-9 are flow diagrams for methods of aligning a path of movement of a mobile device with an indoor routing graph according to an embodiment.

FIG. 9 is a flowchart 900 for a process of aligning a path of movement of a mobile device with an indoor routing graph according to an embodiment. The method may begin at block 910, which may comprise tracing a path of movement of a mobile device from a starting point as described in reference to FIG. 2 herein. At block 920, a mobile device may detect an intersection of a traced path of movement with one or more locations of a routing graph defining feasible movement within an area as described in reference to FIG. 3 herein. At block 930, a mobile device may estimate a contiguous route from one or more locations of the routing graph to the starting point based, at least in part, on a detected intersection and a traced path of movement. A mobile device may estimate a contiguous route to a starting point as described in reference to FIGS. 7A and 7B herein.

Figure 10:
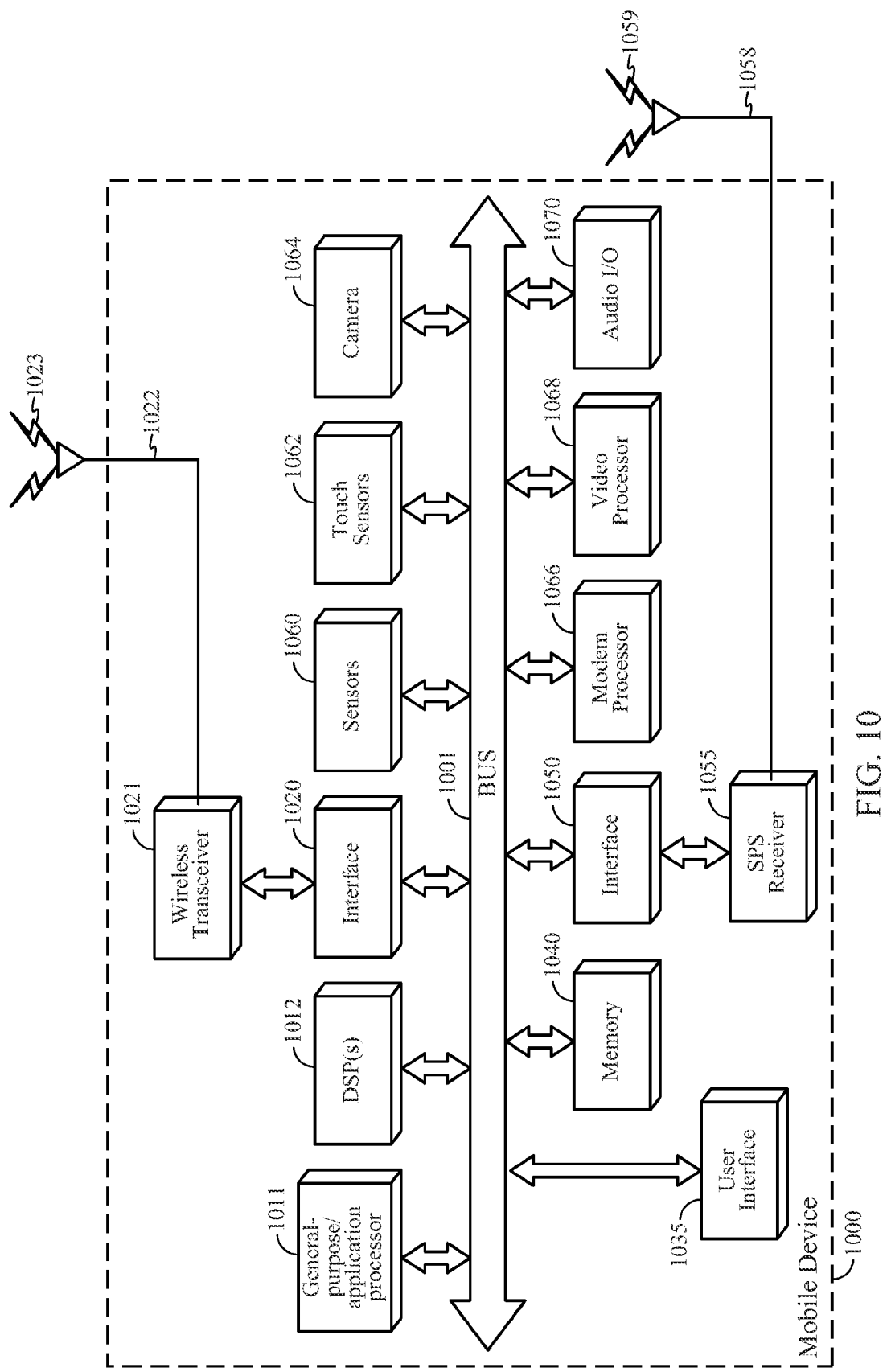
FIG. 10 is a schematic block diagram illustrating an exemplary device, in accordance with an embodiment.

FIG. 10 is a schematic diagram of a mobile device 1000 according to an embodiment. Mobile device 102 (FIG. 1) may comprise one or more features of mobile device 1000 shown in FIG. 10. In certain embodiments, mobile device 1000 may also comprise wireless transceiver 1021, which is capable of transmitting and receiving wireless signals 1023 via antenna 1022 over a wireless communication network. Wireless transceiver 1021 may be coupled to bus 1001 by way of wireless transceiver bus interface 1020. Wireless transceiver bus interface 1020 may, in some embodiments be at least partially integrated with wireless transceiver 1021. Some embodiments may include, for example, multiple wireless transceivers 1021 and wireless antennas 1022 to enable transmitting and/or receiving signals according to corresponding multiple wireless communication standards such as, for example, versions of IEEE Std. 802.11, CDMA, WCDMA, LTE, UMTS, GSM, AMPS, Zigbee, and Bluetooth, just to name a few examples.

Mobile device 1000 may also comprise SPS receiver 1055 capable of receiving and acquiring SPS signals 1059 via SPS antenna 1058. SPS receiver 1055 may also process, in whole or in part, acquired SPS signals 1059 for estimating a location of mobile device 1000. In some embodiments, general-purpose application processor(s) 1011, memory 1040. DSP(s) 1012 and/or specialized processors (not shown) may also be utilized to process acquired SPS signals, in whole or in part, and/or calculate an estimated location of mobile device 1000, in conjunction with SPS receiver 1055. Storage of SPS or other signals for use in performing positioning operations may be performed in memory 1040 or registers (not shown).

Also shown in FIG. 10, mobile device 1000 may comprise digital signal processor(s) (DSP(s)) 1012 connected to the bus 1001 by a bus interface, general-purpose processor(s) 1111 connected to the bus 1001 by a bus interface and to memory 1040. A bus interface may be integrated with the DSP(s) 1012, general-purpose processor(s) 1011 and memory 1040. In various embodiments, functions may be performed in response to execution of one or more machine-readable instructions stored in memory 1040 such as on a computer-readable storage medium, such as RAM, ROM, FLASH, or disc drive, just to name a few example. The one or more instructions may be executable by general-purpose processor(s) 1011, specialized processors, or DSP(s) 1012. Memory 1040 may comprise a non-transitory processor-readable memory and/or a computer-readable memory that stores software code (programming code, instructions, etc.) that are executable by processor(s) 1011 and/or DSP(s) 1012 to perform functions described herein.

Also shown in FIG. 10, a user interface 1035 may comprise any one of several devices such as, for example, a speaker, microphone, display device, vibration device, keyboard, touch screen, just to name a few examples. In a particular implementation, user interface 1035 may enable a user to interact with one or more applications hosted on mobile device 1000. For example, devices of user interface 1035 may store analog or digital signals on memory 1040 to be further processed by DSP(s) 1012 or general-purpose processor 1011 in response to action from a user. Similarly, applications hosted on mobile device 1000 may store analog or digital signals on memory 1040 to present an output signal to a user. In implementations, a user may interact with user interface 1035 to trace a path of movement of the mobile device from a starting point. If a mobile device detects and intersection of the traced path with one or more locations of routing graph defining feasible movement within an area, a mobile device may estimate a contiguous route from one or more locations of the routing graph to the starting point based, at least in part, on the detected intersection and the traced path of movement. A user selection may be transmitted by way of wireless transceiver 1021 to a wireless access point coupled to a map server, for example. Responsive to the query, a server, such as a map server, may respond with one or more digital electronic maps and one or more routing graphs from a current location to a POI overlaid on one or more electronic maps. In another implementation, mobile device 1000 may optionally include a dedicated audio input/output (I/O) device 1070 comprising, for example, a dedicated speaker, microphone, digital to analog circuitry, analog to digital circuitry, amplifiers, and/or gain control. It should be understood, however, that this is merely an example of how an audio I/O may be implemented in a mobile device, and that claimed subject matter is not limited in this respect. In another implementation, mobile device 1000 may comprise touch sensors 1062 responsive to touching or pressure on a keyboard or touch screen device.

Mobile device 1000 may also comprise a dedicated camera device 1064 for capturing still or moving imagery. Camera device 1064 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general-purpose/application processor 1011 or DSP(s) 1012. Alternatively, a dedicated video processor 1068 may perform conditioning, encoding, compression, or manipulation of signals representing captured images. Additionally, video processor 1068 may decode/decompress stored image data for presentation on a display device (not shown) on mobile device 1000.

Mobile device 1000 may also comprise sensors 1060 coupled to bus 1001, which may include, for example, inertial sensors and environment sensors. Inertial sensors of sensors 1060 may comprise, for example accelerometers (e.g., collectively responding to acceleration of mobile device 1000 in three dimensions), one or more gyroscopes or one or more magnetometers (e.g., to support one or more compass applications). Environment sensors of mobile device 1000 may comprise, for example, accelerometers, pedometers, temperature sensors, barometric pressure sensors, ambient light sensors, camera imagers, microphones, just to name few examples. Sensors 1060 may generate analog or digital signals that may be stored in memory 1040 and processed by general purpose application processor 1011 in support of one or more applications such as, for example, applications directed to positioning or navigation operations.

In a particular implementation, mobile device 1000 may comprise a dedicated modem processor 1066 capable of performing baseband processing of signals received and downconverted at wireless transceiver 1021 or SPS receiver 1055. Similarly, modem processor 1066 may perform baseband processing of signals to be upconverted for transmission by wireless transceiver 1021. In alternative implementations, instead of having a dedicated modem processor, baseband processing may be performed by a general-purpose processor or DSP (e.g., general purpose/application processor 1011 or DSP(s) 1012. It should be understood, however, that these are merely examples of structures that may perform baseband processing, and that claimed subject matter is not limited in this respect.

In a particular implementation, mobile device 1000 may be capable of performing one or more of the actions set forth in the process of FIGS. 8 and 9. For example, general-purpose application processor 1011 may perform all or a portion of actions at blocks 810, 820, 830, 840, 850, 860, 910, 920, and/or 930.

Figure 11:
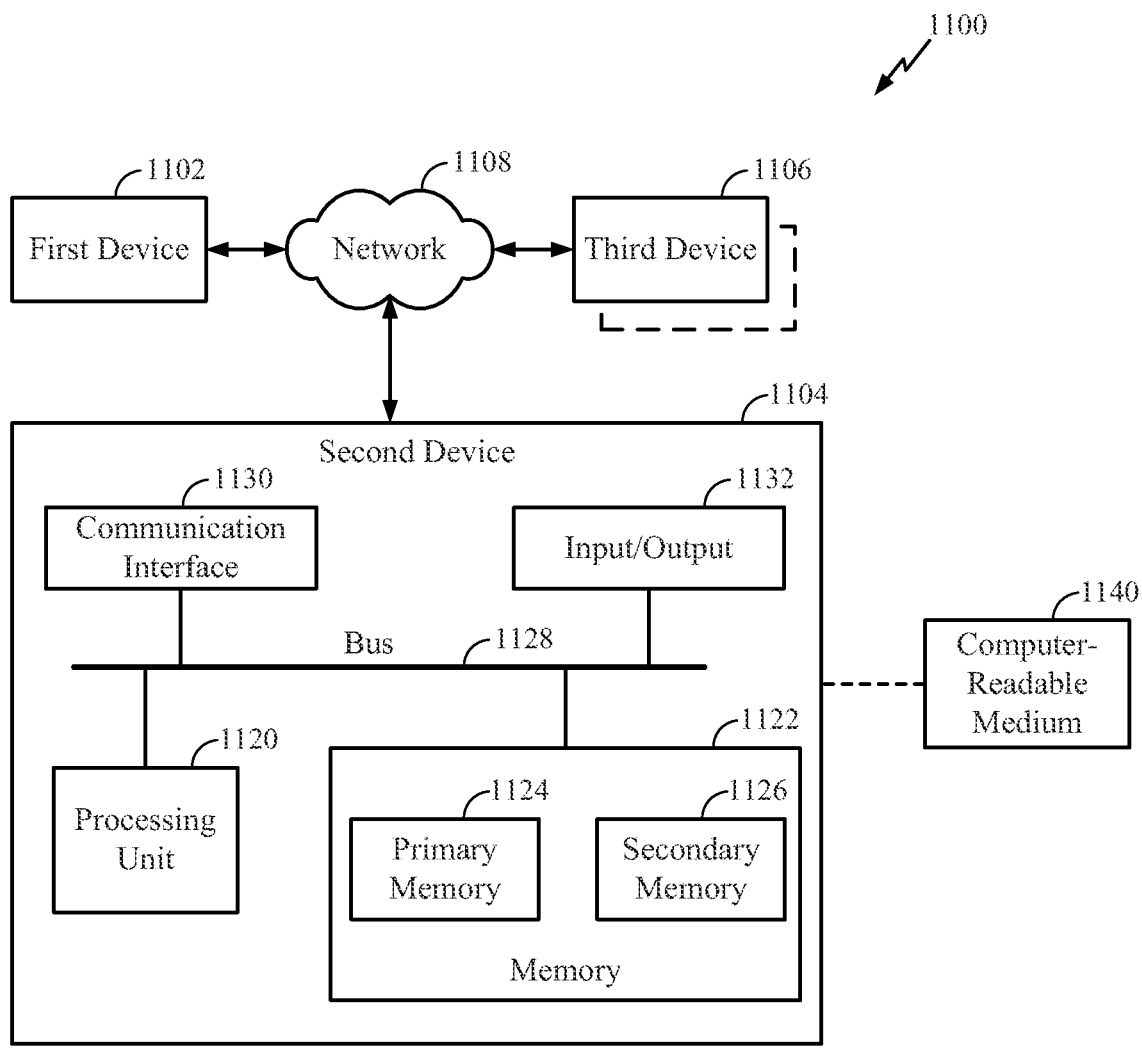
FIG. 11 is a schematic block diagram of an example computing platform in accordance with an embodiment.

FIG. 11 is a schematic diagram illustrating an example system 1100 that may include one or more devices configurable to implement techniques or processes described above, for example, in connection with FIG. 1. System 1100 may include, for example, a first device 1102, a second device 1104, and a third device 1106, which may be operatively coupled through a wireless communications network 1108. In an aspect, first device 1102 may comprise a server capable of providing positioning assistance data such as, for example, a routing graph showing feasible movement on an electronic digital map. Second and third devices 1104 and 1106 may comprise mobile devices, in an aspect. In addition, in an aspect, wireless communications network 1108 may comprise one or more wireless access points, for example. However, claimed subject matter is not limited in scope in these respects.

First device 1102, second device 1104 and third device 1106, as shown in FIG. 11, may be representative of any device, appliance or machine (e.g., such as wireless transmitter 115 or servers 140, 150 or 155 as shown in FIG. 1) that may be configurable to exchange data over wireless communications network 1108. By way of example but not limitation, any of first device 1102, second device 1104, or third device 1106 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1102, 1104, and 1106, respectively, may comprise one or more of a base station almanac server, a base station, or a mobile device in accordance with the examples described herein.

Similarly, communications network 1108 (e.g., in a particular of implementation of network 130 shown in FIG. 1), may be representative of one or more communication links, processes, or resources configurable to support the exchange of data between at least two of first device 1102, second device 1104, and third device 1106. By way of example but not limitation, communications network 1108 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1106, there may be additional like devices operatively coupled to wireless communications network 1108. Thus, by way of example but not limitation, second device 1104 may include at least one processing unit 1120 that is operatively coupled to a memory 1122 through a bus 1128. It is recognized that all or part of the various devices and networks shown in system 1100, and the processes and methods as further described herein, may be implemented using or otherwise including hardware, firmware, software, or any combination thereof.

Processing unit 1120 is representative of one or more circuits configurable to perform at least a portion of a data computing procedure or process. By way of example but not limitation, processing unit 1120 may include one or more processors, controllers, microprocessors, microcontrollers, application specific integrated circuits, digital signal processors, programmable logic devices, field programmable gate arrays, and the like, or any combination thereof.

Memory 1122 is representative of any data storage mechanism. Memory 1122 may include, for example, a primary memory 1124 or a secondary memory 1126. Primary memory 1124 may include, for example, a random access memory, read only memory, etc. While illustrated in this example as being separate from processing unit 1120, it should be understood that all or part of primary memory 1124 may be provided within or otherwise co-located/coupled with processing unit 1120.

In particular implementations, second device 1104 may be capable of computing an estimated location of a mobile device. For example, second device 1104 may receive parameters in messages receiving from a client STA, receiving STA and/or sending STA through communication network 1108 for use in forming expressions for use in computing an estimated location of the client STA. In certain implementations, a transceiver (not shown) of a second device 1104 may transmit an estimated location of second device 1104 to first device 1102. Responsive to receiving an estimated location, first device 1102 may generate a routing graph to a POI, for example for transmission to the second device. Second device 1104 may immediately display relevant POIs by way of a display device (not shown) coupled to, for example bus 1128. In particular implementations, digital electronic maps and routing graphs may be streamed from a first device 1102 to second device 1104. Secondary memory 1126 may include, for example, the same or similar type of memory as primary memory or one or more data storage devices or systems, such as, for example, a disk drive, an optical disc drive, a tape drive, a solid state memory drive, etc. In certain implementations, secondary memory 1126 may be operatively receptive of, or otherwise configurable to couple to, a computer-readable medium 1140. Computer-readable medium 1140 may include, for example, any non-transitory medium that can carry or make accessible data, code, or instructions for one or more of the devices in system 1100. Computer-readable medium 1140 may also be referred to as a storage medium.

Second device 1104 may include, for example, a communication interface 1130 that provides for or otherwise supports the operative coupling of second device 1104 to at least wireless communications network 1108. By way of example but not limitation, communication interface 1130 may include a network interface device or card, a modem, a router, a switch, a transceiver, and the like.

Second device 1104 may include, for example, an input/output device 1132. Input/output device 1132 is representative of one or more devices or features that may be configurable to accept or otherwise introduce human or machine inputs, or one or more devices or features that may be configurable to deliver or otherwise provide for human or machine outputs. By way of example but not limitation, input/output device 1132 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Memory 1122 may represent any suitable or desired information storage medium. For example, memory 1122 may include a primary memory 1124 and a secondary memory 1126. Primary memory 1124 may include, for example, a random access memory, read only memory, etc. While illustrated in this example as being separate from a processing unit, it should be appreciated that all or part of primary memory 1124 may be provided within or otherwise co-located/coupled with processing unit 1120. Secondary memory 1126 may include, for example, the same or similar type of memory as primary memory or one or more information storage devices or systems, such as, for example, a disk drive, an optical disc drive, a tape drive, a solid state memory drive, etc. In certain implementations, secondary memory 1126 may be operatively receptive of, or otherwise enabled to be coupled to, a non-transitory computer-readable medium 1140.

Some portions of the detailed description included herein are presented in terms of algorithms or symbolic representations of operations on binary digital signals stored within a memory of a specific apparatus or special-purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special-purpose computer, special-purpose computing apparatus or a similar special-purpose electronic computing device. In the context of this specification, therefore, a special-purpose computer or a similar special-purpose electronic computing device is capable of manipulating or transforming signals, typically represented as physical electronic or magnetic quantities within memories, registers, or other information storage devices, transmission devices, or display devices of the special-purpose computer or similar special-purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE Std. 802.11x network, and a WPAN may comprise a Bluetooth network, an IEEE Std. 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
tracing a path of movement of said mobile device from a starting point based, at least in part, on one or more signals generated by one or more inertial sensors on board said mobile device;
detecting an intersection of said traced path of movement with one or more locations of a routing graph defining feasible movement within an area;
estimating a contiguous route from said one or more locations of said routing graph to said starting point based, at least in part, on said detected intersection and said traced path of movement; and
in response to a user input signal at said mobile device requesting navigation instructions leading to said starting point, rendering information indicative of at least a portion of said routing graph combined with at least a portion of said traced path of movement via a display of said mobile device.

2. The method of claim 1, wherein tracing said path of movement comprises:
processing signals generated by one or more inertial sensors.

3. The method of claim 2, wherein said tracing said path of movement is based, at least in part, on one or more signals generated by at least one image sensor.

4. The method of claim 2, further comprising:
suspending operation of said one or more inertial sensors responsive to detecting said intersection of said traced path of movement with said one or more locations of said routing graph.

5. The method of claim 1, wherein detecting said intersection comprises:
obtaining one or more position estimations; and
matching said one or more position estimations with one or more points on said routing graph.

6. The method of claim 5, further comprising:
prompting a mobile device user to move to a position at which said mobile device may obtain an estimate of location.

7. The method of claim 6, wherein detecting said intersection further comprises:
merging said routing graph with said traced path of movement.

8. The method of claim 7, wherein said merging comprises:
estimating a stride length of said mobile device user walking in said area; and
modifying at least a portion of said contiguous route responsive to said stride length estimate.

9. The method of claim 8, wherein said modifying comprises:
increasing or decreasing a length of said at least a portion of said traced path of movement.

10. The method of claim 1, wherein said intersection comprises at least one segment defined by two or more position estimations and common to said traced path of movement and said routing graph.

11. The method of claim 1, further comprising:
rendering an estimated location of said mobile device relative to said contiguous route or relative to said routing graph.

12. The method of claim 11, wherein said rendering said estimated location of said mobile device comprises:
indicating a confidence region of said estimated location of said mobile device.

13. The method of claim 1, further comprising:
rendering one or more return paths from an estimated location of said mobile device to said starting point.

14. The method of claim 13, further comprising:
modifying at least a portion of said one or more return paths from a current estimated location of said mobile device to said starting point.

15. A mobile device comprising:
at least one onboard inertial sensor to generate one or more signals responsive to movement of said mobile device; and
one or more processors to:
trace a path of movement of said mobile device from a starting point based, at least in part, on one or more signals generated from said at least one sensor onboard said mobile device;
detect an intersection of said traced path of movement with one or more locations of a routing graph defining feasible movement within an area;
estimate a contiguous route from said one or more locations of said routing graph to said starting point based, at least in part, on said detected intersection and said traced path of movement; and
in response to a user input at said mobile device requesting navigation instructions leading to said starting point, render information indicative of at least a portion of said routing graph combined with at least a portion of said traced path of movement.

16. The mobile device of claim 15, wherein said one or more processors are additionally to:
trace said path of movement by processing signals generated by said at least one sensor, wherein said at least one sensor comprises one or more image inertial sensors, one or more accelerometers, one or more gyroscopes, one or more magnetometers, one or more barometric pressure sensors, one or more pedometers, or any combination thereof.

17. The mobile device of claim 15, wherein said one or more processors are additionally to:
suspend operations of said at least one sensor responsive to detecting said intersection of said traced path of movement with said one or more locations of said routing graph.

18. The mobile device of claim 15, wherein said one or more processors are additionally to:
process one or more output signals from said at least one sensor to estimate a stride length of a mobile device user walking in said area.

19. The mobile device of claim 15, wherein said one or more processors are additionally to:
initiate rendering an estimated location of said mobile device relative to said contiguous route or relative to said routing graph.

20. The mobile device of claim 15, wherein said one or more processors are additionally to:
accept a command from a user interface to indicate a return path from said one or more locations to said starting point.

21. An article comprising:
a non-transitory storage medium comprising machine-readable instructions stored thereon, which are executable by a special-purpose computing apparatus of a mobile device to:
trace a path of movement of said mobile device from a starting point based, at least in part, on one or more signals generated by one or more inertial sensors onboard said mobile device;
detect an intersection of said traced path of movement with one or more locations of a routing graph defining feasible movement within an area; and
estimate a contiguous route from said one or more locations of said routing graph to said starting point based, at least in part, on said detected intersection and said traced path of movement; and
in response to a user input at said mobile device requesting navigation instructions leading to said starting point, render information indicative of at least a portion of said routing graph combined with at least a portion of said contiguous route via a display of said mobile device.

22. The article of claim 21, wherein said storage medium further comprises machine-readable instructions stored thereon which are executable by said special-purpose computing apparatus to:
trace said path of movement by processing signals generated by one or more image sensors, one or more accelerometers, one or more gyroscopes, one or more magnetometers, one or more barometric pressure sensors, one or more pedometers, or any combination thereof.

23. The article of claim 21, wherein said storage medium further comprises machine-readable instructions stored thereon which are executable by said special-purpose computing apparatus to:
obtain one or more estimates of a current location of said mobile device; and
match said one or more estimates of said current location with one or more points on said routing graph.

24. The article of claim 21, wherein said storage medium further comprises machine-readable instructions stored thereon which are executable by said special-purpose computing apparatus to:
process one or more output signals from at least one accelerometer to estimate a stride length of a mobile device user walking in said area.

25. The article of claim 24, wherein said storage medium further comprises machine-readable instructions stored thereon which are executable by said special-purpose computing apparatus to:
modify at least a portion of said contiguous route responsive to said stride length estimate.

26. The article of claim 21, wherein said storage medium further comprises machine-readable instructions stored thereon which are executable by said special-purpose computing apparatus to:
render a confidence region and an estimated location of said mobile device relative to said contiguous route or relative to said routing graph.

27. An apparatus comprising:
means for tracing a path of movement of a mobile device from a starting point based, at least in part, on one or more signals generated by one or more inertial sensors onboard said mobile device;
means for detecting an intersection of said traced path of movement with one or more locations of a routing graph defining feasible movement within an area;
means for estimating a contiguous route from said one or more locations of said routing graph to said starting point based, at least in part, on said detected intersection and said traced path of movement; and
means for rendering information indicative of at least a portion of said routing graph combined with at least a portion of said traced path of movement via a display of said mobile device in response to a user input signal at said mobile device requesting navigation instructions leading to said starting point.

28. The apparatus of claim 27, and further comprising:
means for processing output signals from one or more image sensors.

29. The apparatus of claim 27, and further comprising:
means for obtaining one or more position estimations; and
means for matching said one or more locations with one or more points on said routing graph.

30. The apparatus of claim 27, and further comprising:
means for increasing or decreasing a length of said at least a portion of said traced path of movement responsive to measurement of a stride length of a mobile device user.

* * * * *